Sept. 12, 1950          F. ROTTIER          2,521,998
FRUIT DELIVERY APPARATUS
Filed March 14, 1946          2 Sheets-Sheet 1
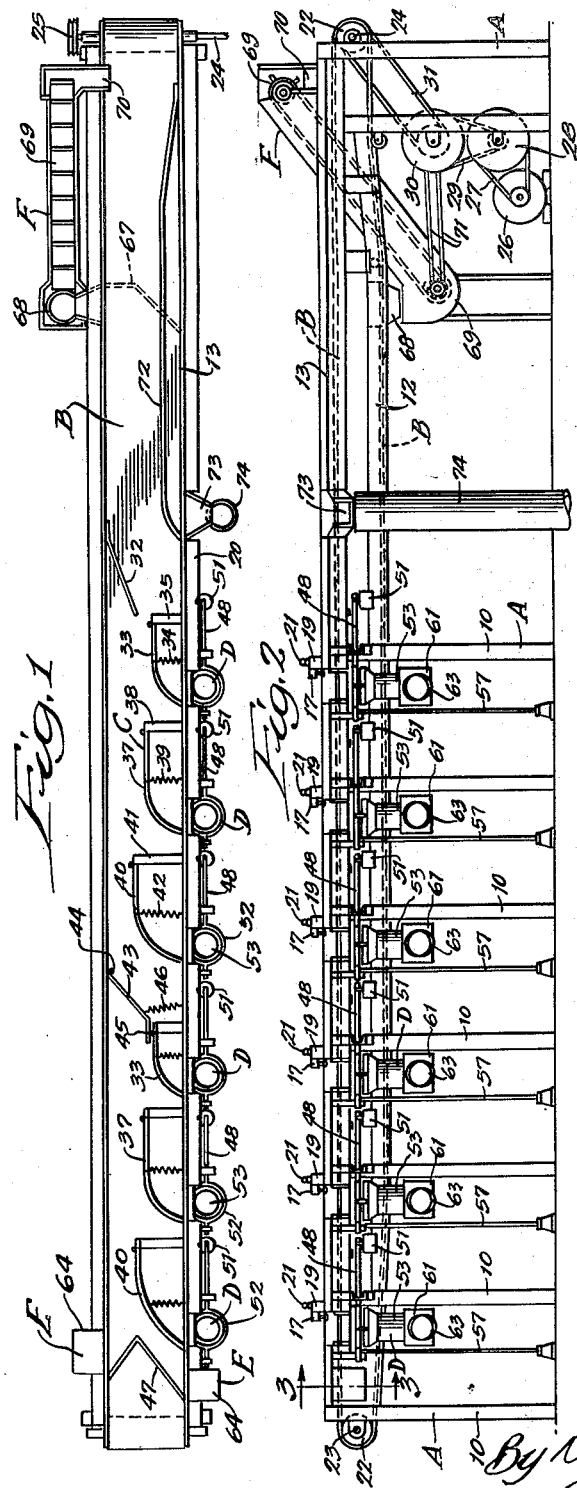
Inventor:
Frank Rottier.
By Dawson, Booth & Spangenberg,
Attorneys.

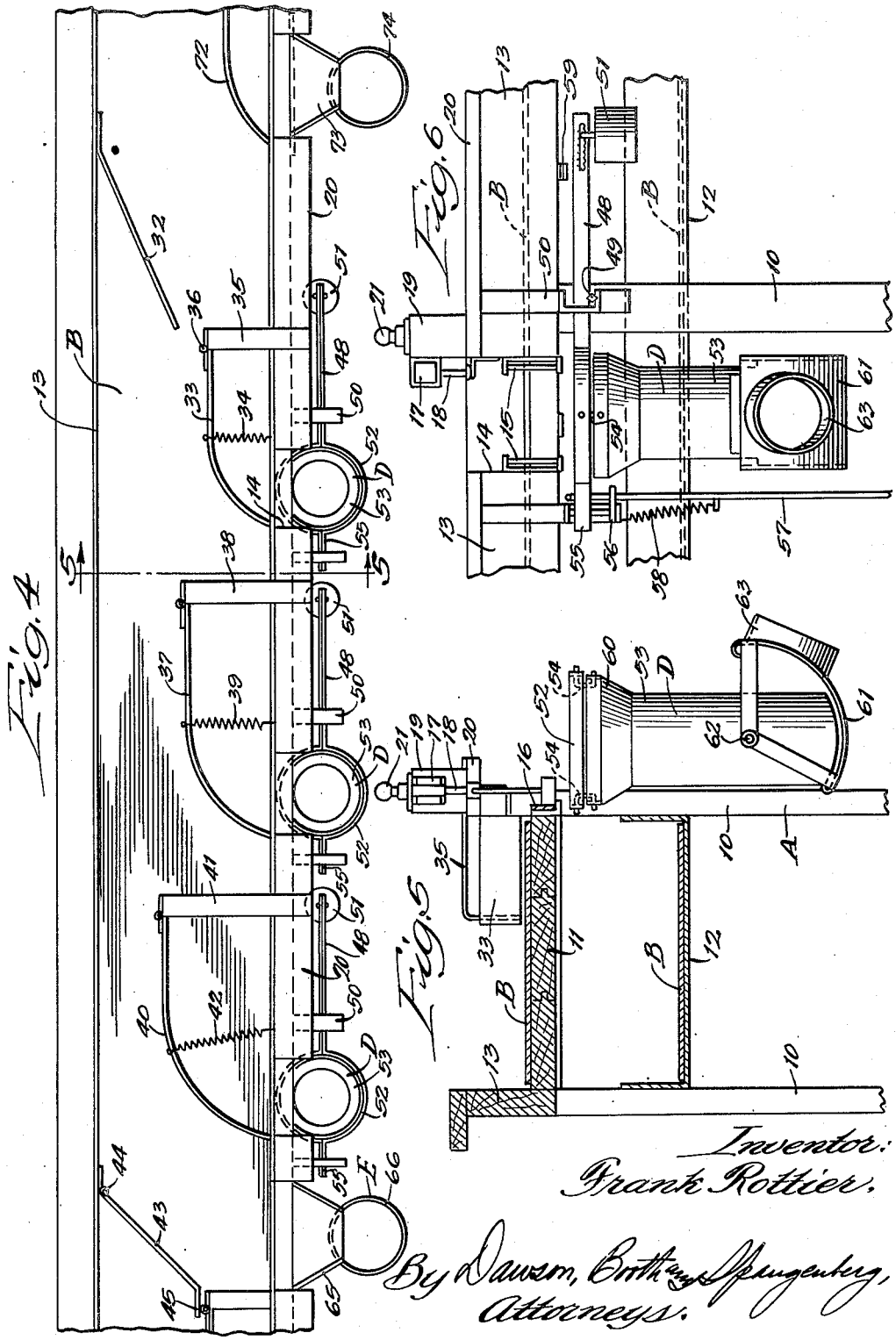

Patented Sept. 12, 1950

2,521,998

UNITED STATES PATENT OFFICE 2,521,998

FRUIT DELIVERY APPARATUS

Frank Rottier, Lansing, Ill., assignor to Piowaty-Bergart Company, Chicago, Ill., a corporation of Illinois Application March 14, 1946, Serial No. 654,391

5 Claims. (Cl. 198—39)

This invention relates to segregating apparatus and method and is particularly useful for collecting, in pre-determined amounts for packaging, produce such as tangerines, onions, potatoes, and other products or articles. The invention is particularly applicable to objects of generally globular form, but will be found useful in the handling of other types of objects or articles.

An object of the invention is to provide a means and method of collecting in segregated and pre-determined amounts produce or other objects which are to be packaged. A further object is to provide means for carrying objects along an elongated path together with means for diverting the objects at spaced intervals into receptacles and in pre-determined amounts for packaging, the objects remaining uncollected at the end of the path being returned for recycling through the same course. Yet another object is to provide a method and automatic mechanism for carrying objects through a continuous path so that the objects are caused to pass by spaced receptacles equipped with automatic weighing devices so that the receptacles are each filled with the objects to a pre-determined weight and maintained ready for enclosure by packages, automatic control means being provided for the entrances to the receptacles and for signaling the filling of the receptacles. Other specific objects and advantages will appear as the specification proceeds.

The invention is illustrated, in a preferred embodiment, by the accompanying drawing, in which:

Figure 1 is a plan view of apparatus embodying my invention; Fig. 2, a side view in elevation; Fig. 3, a transverse sectional view, the section being taken as indicated at line 3—3 of Fig. 2; Fig. 4, a broken detailed plan view of a portion of the conveyor and diversion apparatus and showing a modified form of the invention; Fig. 5, a vertical sectional view, the section being taken as indicated at line 5—5 of Fig. 4; and Fig. 6, a broken side view in elevation of the apparatus adjacent one of the receptacles or collectors.

The apparatus comprises mainly a continuous conveyor by means of which the produce or other objects are carried along a path parallel with spaced receptacles or collectors. Means are provided for diverting a portion of the produce as it travels into the receptacles where the produce is automatically weighed. As soon as a collector has received its quota, by weight, entrance thereto is cut off and the produce travels on to the next collector. Means are provided for returning the produce which is not employed in the filling of the receptacles back to the beginning so that such produce may be carried through the cycle again. The apparatus further provides means for recycling produce or objects at points between the receptacles and before the end of the line of receptacles is reached. The receptacles are equipped with means for carrying packages and for quickly filling the packages. Light signals indicate the completion of the filling of the receptacles.

In the illustration given, A designates a frame; B, a continuous conveyor; C, diversion means; D, receptacles equipped with automatic weighing devices; E, return chutes; and, F, conveyor means for returning produce to the initial starting point on the continuous conveyor B.

The frame A may be of any suitable construction. In the illustration given, it comprises standards 10 providing a bed 11 for the upper portion of the conveyor belt B and a trough 12 for the lower portion of the belt B. The frame A also provides side walls 13 for the upper portion of the belt conveyor B so as to maintain produce thereon. At spaced intervals, as indicated at 14, (Fig. 6) side wall 13 is interrupted on one side to provide outlet ports for the flow of produce therethrough. The outlets 14 are equipped with gate guides 15 in which is mounted a gate 16 adapted to be raised by a solenoid 17 receiving the plunger 18 carrying the gate 16. When the solenoid 17 is actuated, gate 16 is thus raised and maintained in raised position until solenoid 17 is de-energized. The solenoid 17 is supported by a tower 19 carried by the horizontal wall 20 on wall 13. A signal light 21 is also carried by the tower 19 and serves to indicate the completion of the filling operation, as later described.

The conveyor B may be of any suitable construction. In the illustration given, it comprises a continuous belt mounted upon rollers 22, supported at each end of the frame A. The belt B substantially fills the space between the side walls 13 on bed 11 and also substantially fills the space between the side walls of trough 12. The roller 22 at one end is mounted upon an idler shaft 23 and at the other end is mounted upon a drive shaft 24. Drive shaft 24 is equipped with a pulley wheel 25.

Any suitable means for driving the pulley wheel 25 may be employed. In the illustration given best in Fig. 2, motor 26 drives through belt 27 a pulley 28. Pulley 28 drives through belt 29 a multiple pulley 30. Pulley 30 drives through belt 31 the drive pulley 25.

The diversion mechanism C comprises a plurality of structures. A baffle 32 extending over the conveyor belt B deflects the produce or other objects toward the pivoted deflector member 33. The member 33 is curved at its rear portion so as to deflect produce toward the aperture 14 in the side wall 13. A spring 34 normally maintains the member 33 in the position illustrated, but permits it to yield under pressure from produce. A metal strap 35 secured to the horizontal wall 20 extends inwardly over the belt B and carries a hinge 36 supporting the deflector member 33. Spaced rearwardly of the structures 33 and 35 is a similar but larger deflector 37 which is similarly supported upon a cross bar 38 and normally urged inwardly by spring 39. To the rear of the member 37 is a similar but still larger deflector 40 which is supported upon cross beam 41 and normally urged inwardly by spring 42. At this point, a second transverse guide 43, carried by pivot 44, swings inwardly toward the post 45 and is releasably held in position by spring. It will be noted that the springs heretofore mentioned are secured to the members at elevated points above the path of the produce. Behind the deflector guide 43 is a second series of deflectors similar to the members 33, 37 and 40 and of corresponding sizes.

At the extreme rear of the conveyor B is a V-shaped deflector 47 which diverts the produce in two directions and toward the rear outlets E.

Supported upon the standard 10 of the frame A is a weigh arm 48 mounted upon a pivot rod 49 carried by a bracket 50 upon the standard 10, as indicated more clearly in Fig. 6. The weigh arm 48 carries at one end a weight 51 which is adjustable along the arm 48. The weigh arm is preferably formed of two parts and on the side opposite the weight 51 the parts are separated to form a parallel frame 52 which extends above the circular opening of the collector 53. The collector 53 is suspended upon the arm 48 by means of hooks 54 which permit collectors of varying sizes to be readily attached to the ring portion 52 of weigh arm 48. The weigh arm 48 beyond the circular portion 52 is brought together to form a stop extension 55. The extension 55 is received within the stop members 56. A treadle member 57 is provided for holding the end 55 rigid or in lower position while the operator is manipulating the closure 61 in emptying the contents of the bucket. Spring 58 normally urges the member 57 upwardly. Mounted upon the side wall structure 13 and slightly above the weight 51 is a spring contact member 59 which, when the weigh arm moves upwardly and engages it, closes a circuit in which the solenoid 17 and signal light 21 are mounted. When the weigh arm 48 swings clockwise, the contact is broken and the solenoid 17 and signal light 21 become inoperative.

The collector vessel 53 may be of any suitable construction. In the illustration given, it comprises a cylindrical body equipped with a flared neck portion 60. The bottom of the collector 53 is normally closed by a movable closure member 61 mounted upon pivot 62 fixed to the vessel 53. The bottom member 61 is provided on one side with a sleeve 63, the sleeve being substantially the same in diameter as the bottom of collector 53. Thus, when a package is placed upon the sleeve 63 and the bottom 61 is swung inwardly to bring the sleeve 63 into alignment with the bottom of collector 53, the contents of collector 53 will flow into the package.

The return conduits E may be of any suitable construction. In the illustration shown best in Figs. 1, 3 and 4, I provide chutes 64 which receive the produce diverted by the V-shaped guide 47 and lead it downwardly into the trough 12 and upon the lower portion of the conveyor B, as shown more clearly in Fig. 3. It will be understood that other conduits for returning the produce to the trough 12 may be employed and any suitable number of such return conduits may be placed along the side wall 13. As shown more clearly in Fig. 4, I provide laterally extending outlet 65 leading to a circular chute 66 that extends downwardly and opens into the trough 12. The structures 65 and 66 may be omitted or, if desired, structures like 65 and 66 may be interposed behind each of the vessels D.

When the produce is carried back in trough 12 by the lower portion of conveyor B, I provide a transverse deflector or guide 67 which diverts the returning produce laterally into the chute 68. From chute 68 the produce drops into a hopper from whence it may be returned to the original hopper or carried by an elevator belt 69 upwardly to a chute 70 and thus in turn delivers the produce again to the conveyor B. The apparatus F, thus includes the chutes 68 and 70 and the paddle-equipped belt 69. If desired, the conveyor F may be spaced more to the left of the structure shown in Figs. 1 and 2, so as to deposit the returned objects at a point farther along on the belt B, and thus away from any new objects deposited on belt B. The belt conveyor 69 may be driven by a pulley 71 which engages the multiple pulley 30, as shown more clearly in Fig. 2.

Opposite the conveyor F is a guide 72 extending over belt B and leading to an outlet 73. The outlet or chute 73 opens into a conduit for defective produce.

*Operation*

In the operation of the apparatus, produce, such as tangerines, onions, potatoes, or any other form of object or article which is to be collected for packaging, is fed to the conveyor B at a point near the guide 72. An operator is stationed at this point and picks out any defective produce or objects as they are moved past him and he deposits them within the guide 72 so that they will be delivered to the chute 73 and conduit 74 for defective produce or objects. The remaining objects pass on and are proportionately deflected by the guide member 32 toward the members 33, 37 and 40. The produce entering the smaller deflector or enclosure 33 are led through the aperture 14 in wall 13 and into the receptacle 53. When the receptacle 53 has received a predetermined amount of the objects, the weight thereof will tilt the weigh arm 48 and bring the arm against the contact member 59, thus closing the circuits in which the solenoid 17 and signal light 21 are located. The solenoid 17 raises the gate 16 and closes the aperture 14 and, at the same time, the signal light 21 indicates the completion of the filling of the receptacle 53. The weight 51 may be adjusted along the arm 48 to control the desired quantity of produce or other products collected within receptacle 53. The receptacle or bucket 53 be removed and a bucket of greater or lesser size substituted therefor through the use of hooks 54. Thus, the apparatus is readily adaptable to collect different types of objects and to permit the collection of varying amounts of such objects for packaging.

After the gate has been closed for the first receptacle controlled by the deflector 33, the produce carried by belt B tends to force open the member 33 and the produce then flows over into the next enclosure 37. The process thus continues; after each vessel is filled, the deflector becomes inoperative and the produce flows on to fill the next collector.

The remaining produce or other objects reaching the deflector guide 47 is diverted laterally into the return conduit 64 and thus led down into the chute 12 below where conveyor B returns the produce to the deflector 67 near the forward end of the machine. Deflector or guide 67 causes the produce to flow laterally into the chute 68 and thence into the elevator 69. The produce leaving the elevator 69 is discharged through shute 70 on to the top portion of endless conveyor B where it may be recycled along the course already described. There is thus an automatic handling by the conveyor of all of the produce or other objects fed to the conveyor. The machine will eventually collect all of the material fed to it in the desired amounts and will signal the filling of the receptacles.

The only manual operations are those of removing defective objects and placing packages or sacks upon sleeves 63 and the operation of the movable bottom 61 for the filling of the sacks or bags or other packaging.

While in the foregoing specification, I have set forth a description of one embodiment of the invention in considerable detail, it will be understood that such details may be varied widely by those skilled in the art without departing from the spirit of my invention.

I claim:

1. In an apparatus for delivering objects in predetermined quantities for packaging, a frame, a belt conveyor mounted in said frame to provide an upper belt portion and a lower belt portion, each having its top surface adapted to carry objects, a side wall extending along one side of the top surface of the upper belt portion, lateral discharge openings in said side wall, receptacles supported in alignment with said discharge openings to receive objects passed therethrough, gates for closing said discharge openings, means actuated by each of said receptacles when the same are filled beyond a predetermined extent for raising said gates to close said discharge ports, yieldable diverter arms supported by said frame over the top surface of said top belt portion and in spaced longitudinal relation to each other for diverting objects from said belt toward said lateral ports by yielding to permit the passage of said objects with said belt when said discharge ports are closed by said gates, a diverter bar extending across the top surface of said upper belt portion for diverting objects passing said diverter arms to a point laterally of said belt, a chute for directing said objects downwardly onto the top surface of the belt portion below, a second diverter bar extending across the top surface of the lower belt portion toward the end of the belt opposite said chute, and an elevator receiving the objects diverted by said last-mentioned diverter bar and for conveying said returned objects to the top surface of the upper belt portion above said last-mentioned diverter bar.

2. In an apparatus for delivering objects in predetermined quantities for packaging, a frame, a belt conveyor mounted in said frame to provide an upper belt portion and a lower belt portion, each having its top surface adapted to carry objects, a side wall extending along one side of the top surface of the upper belt portion, lateral discharge openings in said side wall, receptacles supported in alignment with said discharge openings to receive objects passed therethrough, gates for closing said discharge openings, means actuated by each of said receptacles when the same are filled beyond a predetermined extent for raising said gates to close said discharge ports, yieldable diverter arms supported by said frame over the top surface of said top belt portion and in spaced longitudinal relation to each other for diverting objects from said belt toward said lateral ports by yielding to permit the passage of said objects with said belt when said discharge ports are closed by said gates, a diverter bar extending across the top surface of said upper belt portion for diverting objects passing said diverter arms to a point laterally of said belt, a chute for directing said objects downwardly onto the top surface of the belt portion below, a second diverter bar extending across the top surface of the lower belt portion toward the end of the belt opposite said chute, and an elevator receiving the objects diverted by said last-mentioned diverter bar and for conveying said returned objects to the top surface of the upper belt portion above said last-mentioned diverter bar, said diverter bar extending across the top surface of the upper belt portion being substantially V-shaped and serving to direct objects to each side of the belt and said chute extending from both sides of the belt for directing said objects onto each side of the top surface of the belt below.

3. In an apparatus for delivering objects in predetermined quantities for packaging, a frame, a belt conveyor mounted in said frame to provide an upper belt portion and a lower belt portion, each having its top surface adapted to carry objects, a side wall extending along one side of the top surface of the upper belt portion, lateral discharge openings in said side wall, receptacles supported in alignment with said discharge openings to receive objects passed therethrough, gates for closing said discharge openings, means actuated by each of said receptacles when the same are filled beyond a predetermined extent for raising said gates to close said discharge ports, yieldable diverter arms supported by said frame over the top surface of said top belt portion and in spaced longitudinal relation to each other for diverting objects from said belt toward said lateral ports by yielding to permit the passage of said objects with said belt when said discharge ports are closed by said gates, a diverter arm extending across the top surface of said upper belt portion for diverting objects passing said diverter arms to a point laterally of said belt, a chute for directing said objects downwardly onto the top surface of the belt portion below, a second diverter bar extending across the top surface of the lower belt portion toward the end of the belt opposite said chute, an elevator receiving the objects diverted by said last-mentioned diverter bar and for conveying said returned objects to the top surface of the upper belt portion above said last-mentioned diverter bar, and deflector blades cooperating with said diverter arms for directing objects on one side of said belt toward said diverter arms.

4. In an apparatus for delivering objects in predetermined quantities for packaging, a frame, an endless belt mounted therein to provide a flat upper portion adapted to receive objects on its top surface and a lower return portion spaced from said upper portion and adapted to return objects, means for moving said belt, side walls extending along the sides of the upper belt portion, discharge ports in one of said side walls, receptacles supported in alignment with said discharge ports, gates controlling said discharge ports, means actuated by the filling of the container to a predetermined extent for raising said gates, posts extending from said side walls over said top surface of the belt and to varying distances over the belt, diverter arms pivoted to said posts and extending inwardly to divert objects through said discharge ports, yieldable spring means for urging said diverter arms into said diverting positions, said diverter arms yielding when said discharge ports are closed to permit the passage of objects with said belt longitudinally of said frame, deflector blades secured to the side wall of said frame opposite said side wall having said discharge ports, a diverter bar supported by said frame over one end of said belt and having laterally and rearwardly extending portions for diverting objects to either side of said belt after the same have passed said deflector blades and diverter arms, a chute for receiving said diverted objects and directing them downwardly and onto the top surface of the lower belt portion, a second diverter bar extending across the lower belt portion at the end opposite the end at which said first diverter bar is located, and an elevator aligned with said second diverter bar for receiving objects returned by said lower belt portion and for depositing the same upon the top surface of the upper belt portion ahead of said diverter arms.

5. In an apparatus for delivering objects in predetermined quantities for packaging, a frame, an endless belt mounted therein to provide a flat upper portion adapted to receive objects on its top surface and a lower return portion spaced from said upper portion and adapted to return objects, means for moving said belt, side walls extending along the sides of the upper belt portion, discharge ports in one of said side walls, receptacles supported in alignment with said discharge ports, gates controlling said discharge ports, means actuated by the filling of the container to a predetermined extent for raising said gates, posts extending from said side walls over said top surface of the belt and to varying distances over the belt, diverter arms pivoted to said posts and extending inwardly to divert objects through said discharge ports, yieldable spring means for urging said diverter arms into said diverting positions, said diverter arms yielding when said discharge ports are closed to permit the passage of objects with said belt longitudinally of said frame, deflector blades secured to the side wall of said frame opposite said side wall having said discharge ports, a diverter bar supported by said frame over one end of said belt and having laterally and rearwardly extending portions for diverting objects to either side of said belt after the same have passed said deflector blades and diverter arms, a chute for receiving said diverted objects and directing them downwardly and onto the top surface of the lower belt portion, a second diverter bar extending across the lower belt portion at the end opposite the end at which said first diverter bar is located, an elevator aligned with said second diverter bar for receiving objects returned by said lower belt portion and for depositing the same upon the top surface of the upper belt portion ahead of said diverter arms, a guide extending over the top surface of the upper belt portion and above said second diverter bar for guiding the returned objects inwardly, and a chute communicating with the belt within said guide adapted to receive objects removed by the operator from the belt and placed laterally of said guide.

FRANK ROTTIER.

REFERENCES CITED

The following references are of record in the file of this patent:

UNITED STATES PATENTS

| Number | Name | Date |
| --- | --- | --- |
| 397,594 | Holley | Feb. 12, 1889 |
| 587,509 | Roberts | Aug. 3, 1897 |
| 713,484 | Nelson | Nov. 11, 1902 |
| 860,936 | Norkewitz | July 23, 1907 |
| 881,940 | Morton | Mar. 17, 1908 |
| 883,848 | Adlam | Apr. 7, 1908 |
| 1,093,815 | Whittier | Apr. 21, 1914 |
| 1,863,562 | Cannon | June 21, 1932 |
| 1,882,440 | Naylor | Oct. 11, 1932 |
| 2,009,049 | Henry | July 23, 1935 |
| 2,327,367 | Nowak | Aug. 24, 1943 |